US012653204B2

(12) United States Patent
Oh et al.

(10) Patent No.: US 12,653,204 B2
(45) Date of Patent: Jun. 16, 2026

(54) METHOD FOR PREPARATION OF INSTANT FOOD HAVING IMPROVED TASTE, NUTRITIONAL VALUE, AND TEXTURE

(71) Applicant: CJ CHEILJEDANG CORPORATION, Seoul (KR)

(72) Inventors: Ye Jin Oh, Seoul (KR); Il Sang Jang, Seoul (KR); Eun Hye Kim, Seoul (KR); Hyeong Seon Park, Seoul (KR); Hyo Young Jeong, Seoul (KR); Hye Mi Choi, Seoul (KR); Sung Yoon Jeong, Seoul (KR); In Won Yoon, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 252 days.

(21) Appl. No.: 18/288,774

(22) PCT Filed: Apr. 28, 2022

(86) PCT No.: PCT/KR2022/006117
§ 371 (c)(1),
(2) Date: Oct. 27, 2023

(87) PCT Pub. No.: WO2022/231355
PCT Pub. Date: Nov. 3, 2022

(65) Prior Publication Data
US 2024/0196937 A1      Jun. 20, 2024

(30) Foreign Application Priority Data
Apr. 29, 2021      (KR) ........................ 10-2021-0056074

(51) Int. Cl.
| | |
|---|---|
| *A23B 2/30* | (2025.01) |
| *A23B 2/10* | (2025.01) |
| *A23B 2/40* | (2025.01) |
| *A23L 7/196* | (2016.01) |
| *A23L 21/25* | (2016.01) |
| *A23L 23/00* | (2016.01) |
| *B65B 25/00* | (2006.01) |

(52) U.S. Cl.
CPC ................ *A23B 2/30* (2025.01); *A23B 2/103* (2025.01); *A23B 2/40* (2025.01); *A23L 7/196* (2016.08); *A23L 21/25* (2016.08); *A23L 23/00* (2016.08); *B65B 25/001* (2013.01)

(58) Field of Classification Search
CPC .. A23B 2/30; A23B 2/40; A23B 2/103; A23L 7/196; A23L 21/25; A23L 23/00; B65B 25/001
See application file for complete search history.

(56) References Cited

U.S. PATENT DOCUMENTS

| | | | | |
|---|---|---|---|---|
| 2,502,196 A | * | 3/1950 | Ball ........................ | A23B 2/00 426/589 |
| 2,789,058 A | * | 4/1957 | Ball ........................ | A23B 2/30 426/628 |
| 3,241,475 A | * | 3/1966 | Schack ................... | A23L 13/06 99/356 |
| 3,437,495 A | * | 4/1969 | Jeppson .................. | A23B 2/08 426/241 |
| 4,156,741 A | * | 5/1979 | Beauvais ................. | A23B 2/30 426/406 |
| 4,522,015 A | * | 6/1985 | Hildebolt ............... | B65B 55/14 422/26 |
| 4,642,968 A | * | 2/1987 | McHenry ............... | B65D 81/18 53/425 |
| 5,653,090 A | * | 8/1997 | Weiss ....................... | B32B 7/04 206/439 |
| 5,707,672 A | * | 1/1998 | Taguchi ................. | A23L 7/1965 422/26 |
| 5,824,266 A | * | 10/1998 | Badertscher ............. | A23B 2/46 422/26 |
| 5,860,356 A | * | 1/1999 | Kageyama ............. | A23B 9/025 99/356 |
| 5,895,626 A | * | 4/1999 | Nakata .................... | A23B 2/40 422/26 |

(Continued)

FOREIGN PATENT DOCUMENTS

| | | |
|---|---|---|
| CN | 110583948 A | 12/2019 |
| EP | 2164756 B1 | 6/2016 |

(Continued)

OTHER PUBLICATIONS

Shidara et al., "Research and Development of Technologies for Continuous Steam Heating for Food", Japan Journal of Food Engineering, vol. 12, No. 4, Dec. 2011, pp. 117-122, with English Abstract.
Takano et al., "The Cutting Edge of Aseptic Packaging and Sterilization Technology", Published by Science Forum Co., Ltd., First Edition, First Printing, Jun. 30, 1999, pp. 91-97 (with partial English Machine translation).
Yokoyama et al., "Next-Generation Aseptic Packaging Technology: Pursuing Quality and Safety", Science Forum Co., Ltd., First Edition, First Printing, Nov. 30, 2004, pp. 155-161, (with partial English Machine translation).
Office Action issued in corresponding Japanese Patent Application No. 2023-566690, dated Oct. 28, 2024.

(Continued)

*Primary Examiner* — Dariush Seif
(74) *Attorney, Agent, or Firm* — Morgan, Lewis & Bockius LLP

(57) ABSTRACT

The present application relates to a method for the preparation of an instant food and an instant food prepared according to same, wherein even when the instant food is prepared using raw ingredients and liquid sauces that are susceptible to microbial contamination or difficult to sterilize, the amount of microorganisms in the prepared instant food is lower than a threshold value, and thus a sufficient sterilization effect can be achieved, and the problem of reduced quality that may cause due to strict sterilization does not occur, and thus an instant food having excellent texture and taste can be provided.

14 Claims, No Drawings

(56) References Cited

U.S. PATENT DOCUMENTS

| | | | | |
|---|---|---|---|---|
| 5,932,265 | A * | 8/1999 | Morgan | A23B 2/704 426/511 |
| 7,931,927 | B2 | 4/2011 | Jeong et al. | |
| 8,337,752 | B2 * | 12/2012 | Yamamoto | B65B 55/027 422/26 |
| 8,834,947 | B2 * | 9/2014 | Di-Principe | A23L 5/32 426/244 |
| 9,352,862 | B2 | 5/2016 | Yum et al. | |
| 9,854,825 | B2 | 1/2018 | Fukumori et al. | |
| 2004/0219267 | A1 * | 11/2004 | Lee | A23B 7/157 426/324 |
| 2009/0004361 | A1 * | 1/2009 | Jeong | A23B 2/30 426/618 |
| 2009/0061058 | A1 * | 3/2009 | Jeong | A23B 2/20 426/392 |
| 2009/0074929 | A1 * | 3/2009 | Kato | A23B 2/754 426/398 |
| 2009/0217626 | A1 * | 9/2009 | Kemp | A61L 2/24 53/97 |
| 2010/0178401 | A1 * | 7/2010 | Van Appeldoorn | B65B 55/025 53/471 |
| 2010/0189866 | A1 * | 7/2010 | Degner | A23L 9/20 426/585 |
| 2010/0296967 | A1 * | 11/2010 | Yamamoto | A23B 7/0056 422/26 |
| 2011/0200724 | A1 * | 8/2011 | Jeong | A23L 7/196 426/392 |
| 2013/0156909 | A1 * | 6/2013 | Yum | A23L 5/13 426/396 |
| 2014/0057029 | A1 * | 2/2014 | Klerken | B65B 55/06 426/412 |
| 2014/0109774 | A1 * | 4/2014 | Fukumori | A23L 7/10 99/371 |
| 2014/0165634 | A1 | 6/2014 | Coelho et al. | |
| 2016/0249655 | A1 * | 9/2016 | Jung | A23L 7/196 426/392 |
| 2017/0156376 | A1 | 6/2017 | Van et al. | |
| 2017/0354170 | A1 * | 12/2017 | Oriere | A23L 19/03 |
| 2019/0159486 | A1 * | 5/2019 | Cheung | A23B 2/30 |
| 2019/0183151 | A1 * | 6/2019 | Cho | A23B 7/01 |
| 2019/0313671 | A1 * | 10/2019 | Cheung | B65B 25/067 |
| 2019/0373923 | A1 | 12/2019 | Van et al. | |
| 2023/0210148 | A1 * | 7/2023 | Sako | A23L 7/197 426/462 |
| 2024/0196937 | A1 * | 6/2024 | Oh | A23B 2/103 |

FOREIGN PATENT DOCUMENTS

| | | | |
|---|---|---|---|
| JP | S60-224478 | A | 11/1985 |
| JP | H05-328918 | A | 12/1993 |
| JP | H08-256709 | A | 10/1996 |
| JP | H09-009937 | A | 1/1997 |
| JP | H09-172992 | A | 7/1997 |
| JP | H09-187238 | A | 7/1997 |
| JP | 5384762 | B1 | 1/2014 |
| JP | 5794299 | B2 | 10/2015 |
| KR | 10-0265482 | B1 | 9/2000 |
| KR | 10-2001-0079456 | A | 8/2001 |
| KR | 10-0877474 | B1 | 1/2009 |
| KR | 10-1184638 | B1 | 9/2012 |
| KR | 10-2015-0087556 | A | 7/2015 |
| KR | 10-2015-0105819 | A | 9/2015 |
| KR | 10-1615931 | B1 | 4/2016 |
| WO | 2008-146166 | A2 | 12/2008 |

OTHER PUBLICATIONS

Kim et al., "Quantitative Analysis of Microbiological Profiles of Retailed White Rice", Journal of Food Hygiene and Safety, vol. 26, No. 3, 2011, pp. 198-202 with an English abstract.
Office Action issued in corresponding Australian Patent Application No. 2022264154, dated Jan. 31, 2025.
Extended European Search Report issued in corresponding European Patent Application No. 22796187.7, dated Mar. 26, 2025.
International Search Report issued in corresponding International Patent Application No. PCT/KR2022/006117, dated Aug. 18, 2022.
Office Action issued in corresponding Chinese Patent Application No. 202280043837.7, dated Aug. 12, 2025.

* cited by examiner

METHOD FOR PREPARATION OF INSTANT FOOD HAVING IMPROVED TASTE, NUTRITIONAL VALUE, AND TEXTURE

TECHNICAL FIELD

The present application relates to a method for the preparation of an instant food and an instant food prepared thereby.

BACKGROUND ART

An instant food, which is less required for trimming and preparing raw ingredients directly or being cooked accurately and skillfully according to a recipe, has an advantage of being convenient because the time required to be taken is short and an effort required to complete cooking is low. As the number of families who directly cook and prepare meals gradually decreases and the number of single-person households increases, the demand for the instant food that can be easily cooked and taken is also increasing, and various types of food are prepared and sold in the market in the form of the instant food. However, the instant food has a disadvantage of being easily perishable because being distributed for a relatively long time in a semi-cooked state, so that special attention needs to be paid to sterilization when preparing the instant food. In particular, as the types of food prepared in the form of instant food diversify, the possibility of microbial contamination problems is gradually increasing while various types of raw ingredients are used or liquid sources are added, and the demand for high-quality instant food is increasing while solving this problem.

The instant food is sold in a cooked state, and thus there is an advantage that consumers who purchase the instant food may eat the instant food right away, and easily enjoy high-quality cooked grains (Bap) through a simple cooking process using a microwave, etc. However, in instant food that is distributed for a long period of time and stored at room temperature, there is a high need to control microbial contamination through sufficient sterilization. When excessive sterilization conditions are applied to sterilize the instant food, the quality of the raw ingredients may be damaged and deteriorated. Therefore, it is an important solution in the field of the instant food or the instant rice to achieve a sterilization effect while maintaining the quality of the raw ingredients.

The solving of the above-mentioned problems becomes more important in the instant food, which contains a lot of moisture or uses more raw ingredients susceptible to microbial contamination even in the instant food. When using raw ingredients that contain a lot of moisture or are susceptible to microbial contamination, sterilization is difficult and quality deterioration due to sterilization is noticeable, so that the need for sterilization and quality management is particularly high. In the case of a mixed rice in the form of the instant food on the market or the instant food containing many raw ingredients, since raw ingredients susceptible to microbial contamination are use, even if the sterilization conditions are satisfied, the quality of Bap is significantly reduced to have poor texture and taste in many cases. Korean Laid-open Patent Publication No. 10-2015-0105819 discloses a method for preparing sterile packaged instant flavored glutinous rice containing nuts, and a method of first cooking flavored glutinous rice by mixing ingredients, and then heating the rice to high temperature to sterilize and package the rice, and thus, it discloses only a method without considering a problem of deterioration of Bap quality due to sterilization at all. Recently, the convenience food market is gradually increasing, and as the demand for various types of the instant food in addition to the existing white rice Bap increases, a demand for the instant food having similar quality to food cooked at home or in restaurants and a need for development thereof are also increasing.

PRIOR ART DOCUMENT

Patent Document (Patent Document 1) Korean Laid-open Patent Publication No. 10-2015-0105819

DISCLOSURE

Technical Problem

It is an object of the present application to provide a method for the preparation of an instant food so as not to damage the quality of liquid sauces by sterilization while reducing the number of microorganisms in solid liquid sauces to a threshold value or lower through sufficient sterilization when preparing the instant food prepared using solid raw ingredients that are susceptible to microbial contamination and liquid sauces that are difficult to sterilize.

It is another object of the present application to provide an instant food having excellent quality that embodied the taste, nutritional value, and texture even while containing microorganisms below a threshold level through sufficient sterilization as described above.

Technical Solution

An aspect of the present application provides a method for the preparation of an instant food including filling solid raw ingredients into a container; sterilizing the solid raw ingredients filled in the container with pressurized steam in a vacuum state; liquid-sterilizing liquid sauces by spraying steam directly on the liquid sauces; adding the sterilized sauces to the sterilized raw ingredients; sealing the container added with the sterilized sauces; and heating the sealed container at a temperature of 90° C. to 125° C. for 10 to 25 minutes.

Another aspect of the present application provides an instant food prepared by the method for the preparation of the instant food.

Hereinafter, the present application will be described in detail.

Method for the Preparation of Instant Food

The term "instant food" used herein means a processed food in a semi-cooked or cooked state that is able to be taken after a simple cooking process or taken immediately without cooking. The instant food may be distributed at room temperature, refrigerated, or frozen, and more specifically, may be distributed at room temperature.

The instant food may include liquid sauces, and specifically at least one selected from the group consisting of instant rice, soups, porridge, and one-dish meals, but is not limited thereto. The soups may be, for example, cream soup, vegetable soup, tomato soup, corn soup, mushroom soup, etc., but are not limited thereto. The porridge may be, for example, abalone porridge, scorched rice porridge, five-grain porridge, vegetable porridge, mushroom porridge, seafood porridge, red bean porridge, pumpkin porridge, etc., but is not limited thereto. The one-dish meals refer to dish or food made by putting main raw ingredients and auxiliary raw ingredients in one form, and for example, may be made with Bap as the main raw ingredient and auxiliary raw ingredients together. The one-dish meals may be, for example, fish rice, fish hot pot rice, seasoned vegetable rice, seasoned vegetable hot pot rice, rice topped with meat, etc., but are not limited thereto.

Although an instant rice prepared through the method for the preparation of the instant food of the present application is in the form of an instant food, the instant rice may exhibit excellent quality that embodied the taste, nutritional value, texture of hot pot rice. The hot pot rice refers to Bap cooked using a pot, and specifically, may be rice cooked in a pressure rice pot or an iron pot, particularly a stone pot, an iron pot such as a cast iron pot, to embody more improved texture.

The term "cooked grains (Bap)" used herein refers to all foods prepared by adding water to grains, pressurizing, and heating the grains. When compared to porridge, the Bap is maintained in the form of grains, characterized to be chewed and eaten, and has a feature of having less moisture than porridge. The Bap may be commonly taken as a staple food in East Asia including Korea and Southeast Asia, and mainly prepared using rice, but may be prepared with other grains instead of rice, or prepared by mixing rice with other grains, or may be prepared using additional raw ingredients other than grains.

The term "instant rice" used herein means Bap made in the form of an instant food. The instant rice is a processed food that is able to be eaten in itself without a separate cooking process, or eaten through a simpler cooking process than a conventional method of preparing and cooking Bap, and prepared for convenient storage, reposition, transportation, and portability.

A method for the preparation of the instant food of the present application includes filling solid raw ingredients into a container; sterilizing the solid raw ingredients filled in the container with pressurized steam in a vacuum state; liquid-sterilizing liquid sauces by spraying steam directly on the liquid sauces; adding the sterilized sauces to the sterilized raw ingredients; sealing the container added with the sterilized sauces; and heating the sealed container at a temperature of 90° C. to 125° C. for 10 to 25 minutes.

Specifically, the solid raw ingredients may include at least one selected from the group consisting of grains, beans, mushrooms, root and tuber crops, bulbs, seasoned vegetables, fruits/seeds, meat, fish, and eggs. The grains may include rice or mixed grains other than rice, and the rice may include at least one selected from the group consisting of white rice, black rice, brown rice, non-glutinous rice, and glutinous rice. The mixed grains may include at least one selected from the group consisting of barley, soybeans, red beans, foxtail millet, wheat, rye, bran, buckwheat, oats, millet, corn, and sorghum. However, the type of mixed grain is not limited thereto, and any mixed grain may be used as long as it may be commonly used in the preparation of Bap, and for example, any mixed grain may be used as long as it is used for the preparation of mixed grain rice or nutritious rice. The instant food or instant rice of the present application may be prepared using only raw ingredients other than white rice, or may be used with both white rice and raw ingredients other than white rice. The beans may include at least one selected from the group consisting of white beans, green kernel black beans, black beans, yellow beans, medicinal beans, kidney beans, peas, black azuki beans, mung beans, lentils, horse beans, and red beans, but are not limited thereto, and the beans may include all edible plants classified as the legume family. The mushrooms may include at least one selected from the group consisting of king oyster mushroom, shiitake mushroom, oyster mushroom, button mushroom, and enoki mushroom. However, the type of mushroom is not limited thereto, and any edible mushroom may be used without limitation, and for example, any mushroom may be used as long as it is used for preparing mushroom rice. The bulbs may include at least one selected from the group consisting of lotus root, burdock, carrot, and bellflower root, but are not limited thereto. The root and tuber crops may include at least one selected from the group consisting of sweet potatoes, potatoes, and pork potatoes, but are not limited thereto. The seasoned vegetables may include at least one selected from the group consisting of seasoned aster, seasoned thistle, bracken fern, sedum, groundsel, chives, thunberg onion, butterbur, wild garlic, purslane, and *aralia*, but are not limited thereto. The fruits/seeds may include at least one selected from the group consisting of jujubes, chestnuts, pine nuts, raisins, and pumpkin seeds, but are not limited thereto. The meats may include lean meat, muscle, fat, or mixtures thereof isolated from at least one animal selected from the group consisting of cattle, horse, sheep, goat, deer, and poultry (chicken, duck, geese, turkey, ostrich, turkey, and pheasant), but are not limited thereto. The fish meat includes meat isolated from marine products, eggs of marine products, or foods processed thereof, and for example, may be raw meat isolated from marine products, paste, fish cake, fish meat sausage, etc., but is not limited thereto. The marine products may be fish (cod, pollack, croaker, mackerel, Spanish mackerel, saury, etc.), squid, octopus, octopus minor, shrimp, crab, clam meat, etc., and the roes of the marine products may be pollack roe, cod roe, flying fish roe, shark roe, etc., but are not limited thereto. The eggs include foods obtained from eggs obtained from animals, such as poultry eggs or egg processed products, and may all include eggs, whole eggs, egg yolk, egg white, etc. Specifically, the eggs may be eggs, duck eggs, quail eggs, goose eggs, ostrich eggs, or processed products thereof, but are not limited thereto.

The solid raw ingredients may include raw ingredients other than white rice (e.g., grains other than white rice, beans, mushrooms, root and tuber crops, seasoned vegetables, fruits/seeds, meats, fish meat, eggs, etc.) in an amount of 10 to 100 parts by weight based on 100 parts by weight of the total raw ingredients. Specifically, the content of the raw ingredients other than white rice may be in a range consisting of a lower limit selected from 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, and 60 parts by weight, and/or an upper limit selected from 100 parts by weight, 95 parts by weight, 90 parts by weight, 85 parts by weight, 80 parts by weight, 75 parts by weight, 70 parts by weight, and 65 parts by weight. For example, the content of the raw ingredients other than white rice may be 10 to 100 parts by weight, 15 to 95 parts by weight, 20 to 90 parts by weight, 30 to 85 parts by weight, 40 to 80 parts by weight, 50 to 80 parts by weight, 60 to 70 parts by weight, or 60 to 65 parts by weight, but is not limited thereto. When the content of the raw ingredients other than white rice is 100 parts by weight, the raw ingredients may not contain white rice at all, and in this case, an instant rice or an instant food prepared using the raw ingredients may not also contain white rice at all. The "rice", a concept that includes white rice, black rice, brown rice, etc., may be any rice as long as it is commonly used for preparing Bap regardless of its type, and may be, for example, japonica or indica rice, but is not limited thereto. In addition, the rice may be non-glutinous rice, glutinous rice, or a combination thereof. The non-glutinous rice may contain starch raw ingredients of amylose and amylopectin, and the glutinous rice starch may contain starch ingredient of amylopectin. Compared to the non-glutinous rice, the glutinous rice may have more stickiness of Bap when cooking the rice. In addition, the rice may be used regardless of its degree of polishing, and may be 50% polished rice, 70% polished rice, and/or 90% polished rice, in addition to the white rice and brown rice. The types of rice described above may be appropriately selected depending on the type and characteristics of Bap or food to be finally prepared, and the mixing ratio of each type of rice may also be appropriately selected and used.

In the present application, the solid raw ingredients used in the preparation of an instant food are susceptible to microbial contamination because the number of microorganisms contained therein is greater than the number of microorganisms contained in other solid raw ingredients, or may not be sufficiently sterilized through a conventional sterilization process. Specifically, the solid raw ingredients may have the number of microorganisms of $10^2$ cfu/ml to $10^8$ cfu/ml in the solid raw ingredients before sterilization, and for example, the number of microorganisms may be in the range of $10^3$ cfu/ml to $10^7$ cfu/ml, 1,500 cfu/ml to 5,000,000 cfu/ml or 1,800 cfu/ml to 4,500,000 cfu/ml. In addition, the number of microorganisms in the solid raw ingredients before sterilization may be the number of microorganisms measured before sterilizing a mixture of two or more solid raw ingredients. The number of microorganisms in the solid raw ingredient mixture before sterilization may be 105 cfu/ml to $10^8$ cfu/ml, and for example, the number of microorganisms in the solid raw ingredient mixture before sterilization may be 500,000 cfu/ml to 5,000,000 cfu/ml or 550,000 cfu/ml to 1,200,000 cfu/ml. Accordingly, when considering an effect on the health of people who eat instant food or instant rice and a legal acceptable level of the number of microorganisms in instant food or instant rice, in order to meet the standard by reducing the number of microorganisms contained in instant food or instant rice prepared using the raw ingredients, stricter sterilization may be required than when using other solid raw ingredients. However, when instant food or instant rice is prepared through strict sterilization conditions and sterilization methods, microbial contamination may be controlled, but there is a problem that the quality of instant food or instant rice may decrease due to the sterilization process. The present application is an invention intended to solve the problems that occur when preparing instant food or instant rice using the solid raw ingredients, and the instant food or instant rice prepared according to the method for preparing the instant food or instant rice of the present application has an effect of not deteriorating the quality of the instant food or instant rice even while exhibiting a sufficient sterilization effect.

In addition, the liquid sauces included in the instant food of the present application, like the solid ingredients, may also be susceptible to microbial contamination or not be sufficiently sterilized through a general sterilization process. Since the liquid sauces play a major role in determining the taste and quality of the instant food containing the liquid sauces, even if the sterilization of the liquid sauces is performed, the quality of the liquid sauces, such as viscosity or sugar content needs not to deteriorate.

Accordingly, when considering an effect on the health of people who eat instant food and an acceptable level threshold value of the number of microorganisms in instant food, in order to meet the standard by reducing the number of microorganisms contained in instant food prepared using the solid ingredients and the liquid sauces, stricter sterilization may be required than when preparing general instant food. However, when instant food is prepared through strict sterilization conditions and sterilization methods, microbial contamination may be controlled, but there is a problem that the quality of the instant food and the liquid sauces may decrease due to the sterilization process. The present application is an invention intended to solve the problems that occur when preparing the instant food using the solid raw ingredients and the liquid sauces, the instant food prepared according to the method for the preparation of the instant food of the present application has an effect of not deteriorating the quality of the instant food and the liquid sauces included therein even while exhibiting a sufficient sterilization effect.

The sterilizing of the solid raw ingredients may be sterilizing the solid raw ingredients with pressurized steam in a vacuum state, and may be sterilizing the solid raw ingredients by directly applying the steam to the solid raw ingredients. The sterilization may be performed sequentially through vacuum, steam sterilization, reduced pressure, and vacuum cooling. More specifically, the solid raw ingredients may be placed in the vacuum pressurized sterilizer, and then subjected subsequently to steam sterilization, reduced pressure, and vacuum cooling after the interior of the vacuum pressurized sterilizer is made in a vacuum state. The solid raw ingredients may be sold raw ingredients filled in an unsealed container. The interior of the vacuum pressurized sterilizer is made in the vacuum state before steam sterilization to achieve heat transfer efficiency (rapid heat transfer) and homogeneity during the steam sterilization. The vacuum pressurized sterilizer may use, for example, a RIC device manufactured by Hisaka Seisakusho Co., Ltd., but is not limited thereto.

The sterilizing step of the solid raw ingredients may be performed with steam at 120° C. to 140° C. for 1 to 10 minutes. Specifically, the steam temperature may be a temperature in the range consisting of a lower limit selected from 120° C., 121° C., 122° C., 123° C., 124° C., 125° C., 126° C., 127° C., 128° C., 129° C., and 130° C., and/or an upper limit selected from 140° C., 139° C., 138° C., 137° C., 136° C., 135° C., 134° C., 133° C., 132° C., 131° C., and 130° C. For example, the sterilization may be performed with steam at 120° C. to 140° C., 121° C. to 139° C., 122° C. to 138° C., 123° C. to 137° C., 124° C. to 136° C., 125° C. to 135° C., 126° C. to 134° C., 127° C. to 133° C., 128° C. to 132° C., 129° C. to 131° C., 129° C. to 130° C. or 130° C. to 131° C., but is not limited thereto. The sterilization time may be the time in the range of a lower limit selected from 1 minute, 2 minutes, 3 minutes, 4 minutes, 4 minutes and 30 seconds, 5 minutes, 5 minutes and 30 seconds, 6 minutes, 6 minutes and 30 seconds and 7 minutes, and/or an upper limit selected from 10 minutes, 9 minutes 30 seconds, 9 minutes, 8 minutes 30 seconds, 8 minutes, 7 minutes 30 seconds, 7 minutes, 6 minutes 30 seconds, and 6 minutes. For example, the sterilization may be performed for 1 minute to 10 minutes, 2 minutes to 9 minutes, 3 minutes to 8 minutes, 4 minutes to 7 minutes, 5 minutes to 6 minutes, 5 minutes 30 seconds to 6 minutes, 5 minutes to 5 minutes 30 seconds, 6 minutes to 10 minutes, 7 to 10 minutes, or 7 minutes to 9 minutes, but is not limited thereto, and the sterilization time may vary within the range depending on the volume of solid raw ingredients to be sterilized. For example, when preparing the instant rice in a volume suitable for one meal per person, the sterilization time may be 4 to 6 minutes, and when preparing the instant food in a larger volume than the volume for one meal per person, the sterilization time may be increased to a range of 7 minutes to 10 minutes and may be appropriately changed depending on the volume.

In addition, the sterilizing step of the solid raw ingredients may be performed by repeatedly contacting the solid raw ingredients with steam 5 to 10 times at 140° C. to 155° C. for 3 to 10 seconds. Specifically, the steam temperature may be in the range consisting of a lower limit selected from 140° C., 142° C., 145° C., and 147° C. and/or an upper limit selected from 155° C., 153° C., 150° C., and 148° C. For example, the sterilization may be performed with steam at 140° C. to 155° C., 142° C. to 153° C., 145° C. to 150° C., 145° C. to 148° C., 147° C. to 150° C. or 147° C. to 148° C., but is not limited thereto. The steam contacting time may be the time consisting of a lower limit selected from 3 seconds, 4 seconds, 5 seconds and 6 seconds and/or an upper limit selected from 10 seconds, 9 seconds, 8 seconds and 7 seconds. For example, the steam contacting time may be 3 seconds to 10 seconds, 4 seconds to 9 seconds, 5 seconds to 8 seconds, 6 seconds to 8 seconds, 5 seconds to 7 seconds, or 6 seconds to 7 seconds, but is not limited thereto. The contacting of the solid raw ingredients with the steam may be repeated 5 to 10 times, 6 to 9 times, 6 to 8 times, 7 to 9 times, or 7 to 8 times.

The sterilizing of the solid raw ingredients may be performed under conditions of an F0 value of 4 or higher. In the present application, the term "F value" refers to the time required to kill a specific microbial strain at a specific temperature, which may be calculated through a heat lethal time curve for the microorganism. The F value may be determined according to a Z value and a heating temperature according to a type of microorganism to be sterilized. Among them, "F0 value" may be defined as the F value when a Z value is 18° F. or 10° C. and the heating temperature is 250° F. or 121.1° C. The Z value of 10° C. is based on the value when sterilizing a standard microbial strain. The F0 value is a value that may be used as a measure of the level of sterilization in the art. Specifically, the F0 value may be measured by a probe of a sensor, which is a cumulative amount of heat transferred to a sample during the heat treatment time. For example, the F0 value may be measured by inserting the probe of the sensor into a cold point (a point where heat is transferred last within the sample or generally the center of the sample) in the sample and then checking the cumulative amount of heat to be transferred during heat application, and may be converted and calculated by setting the amount of heat corresponding to 121.1° C. and 1 minute to 'F0=1'.

In the method for the preparation of the instant food of the present application, the solid raw ingredients filled in the container are sterilized under conditions of an F0 value of 4 or higher. At this time, when describing the meaning of sterilization under the condition of 'F0 value=4' as an example, according to the definition of the F0 value, it means sterilizing standard microorganisms with Z value of 10° C. to a level that may kill the microorganisms when sterilization is performed at a temperature of 121.1° C. for 4 minutes. The F0 value may be calculated according to Equation 1 below. Specifically, the sterilization performed by the sterilizing unit may be performed under a condition of an F0 value of 4 or more, 4.5 or more, 5 or more, 6 or more, 7 or more, 8 or more, 10 or more, 20 or more, 30 or more, or 40 or more, but is not limited thereto.

$$F_0 = t(\text{time}) \times 10^{\frac{T(Temperature-121.1° C.}{10° C.}}$$ [Equation 1]

8 wherein, the unit of t (time) is minute, and the unit of T (temperature) is ° C.

The method for the preparation of instant food of the present application may further include immersing the solid raw ingredients in water, before filling the solid raw ingredients in the container. The immersing step may include washing the solid raw ingredients with water, and for example, the solid raw ingredients may be immersed for 20 minutes to 80 minutes by adding 200 parts by weight to 300 parts by weight of water with respect to total 100 parts by weight of the washed solid raw ingredients, but is not limited thereto. The immersing step may be performed in the same manner as a process of soaking grains in water when generally cooking and preparing food or Bap.

After the immersing step, a step of removing water may be further performed before filling the solid raw ingredients in the container. As a result of removing the water, before the sterilizing step, 0 to 10 parts by weight of water based on 100 parts by weight of the solid raw ingredient may be filled together in the container.

The method for the preparation of instant food of the present application includes liquid-sterilizing the liquid sauces by spraying steam directly to the liquid sauces.

The liquid-sterilizing step of the liquid sauces may be performed for 6 to 8 minutes by directly spraying steam at 130° C. to 140° C. to the liquid sauces. Specifically, the steam temperature may be a temperature in the range consisting of a lower limit selected from 130° C., 130.5° C., 131° C., 131.5° C., 132° C. and 132.5° C. and/or an upper limit selected from 140° C., 139° C., 138° C., 137° C., 136° C., 135° C., 134.5° C., 134° C., 133.5° C., 133° C. and 132.5° C. For example, the sterilization may be performed with steam at 130° C. to 140° C., 130.5° C. to 138° C., 131° C. to 136° C., 131.5° C. to 135° C., 132° C. to 133° C., 132.5° C. to 135° C. or 130° to 132.5° C., but is not limited thereto. The sterilization of the water or sauce may be performed by spraying and injecting the steam at the temperature directly into the water or sauce to raise the temperature, and then passing the water or sauce through a pipe that maintains heat for 6 to 8 minutes. Specifically, the sterilization time after the steam injection may be 6 minutes to 8 minutes, 6 minutes 30 seconds to 8 minutes, 6 minutes to 7 minutes 30 seconds, 6 minutes 30 seconds to 7 minutes 30 seconds, 7 minutes to 8 minutes, or 6 minutes to 7 minutes.

The liquid-sterilizing step of the liquid sauces may be performed using a Direct-Steam Injection (DSI) sterilization device. The liquid-sterilizing may be performed by setting the temperature and time conditions of the DSI sterilization device as described above.

The liquid sauces may be used without limitation as long as the liquid sauces are liquid sauces to be added to impart characteristics such as taste, shape, and physical properties to be implemented in the instant food of the present application, and specifically, may contain sugars and/or salts. More specifically, the liquid sauces may be prepared by mixing liquid raw ingredients and/or powdered raw ingredients at a predetermined ratio, and the liquid raw ingredients may be soy sauce, vegetable/animal raw ingredient concentrate, fruit and vegetable paste, honey, oligosaccharide, starch syrup, etc., but are not limited thereto, and the powdered raw ingredients may be salt, sugar, pepper, red pepper powder, etc., but are not limited thereto.

The sugar content of the liquid sauces may be 0 to 60 brix. Specifically, the sugar content of the liquid sauces may be the sugar content in the range consisting of a lower limit selected from 0, 5, 10, 15, 20, 25 and 30 brix and/or an upper limit selected from 60, 55, 50, 45, 40, 35 and 30 brix. For example, the sugar content may be 0 to 60 brix, 5 to 55 brix, 10 to 50 brix, 15 to 45 brix, 20 to 40 brix, 25 to 35 brix, 30 to 35 brix, or 35 to 40 brix, but is limited thereto.

The viscosity of the liquid sauces may be 0 to 2,000 cp. Specifically, the viscosity of the liquid sauces may be the viscosity in the range consisting of a lower limit selected from 0, 10, 100, 200, 300, 400, 500, 600, 700, 800, 900, and 1000 cp and/or an upper limit selected from 2,000, 1,900, 1,800, 1,700, 1,600, 1,500, 1,400, 1,300, 1,200, 1,100, and 1,000 cp. For example, the viscosity may be 0 to 2,000 cp, 100 to 1,900 cp, 200 to 1,800 cp, 300 to 1,700 cp, 400 to 1,600 cp, 500 to 1,500 cp, 600 to 1,400 cp, 700 to 1,300 cp, 800 to 1,200 cp p, 900 to 1,100 cp, 1,000 to 1,100 cp or 900 to 1,000 cp, but is not limited thereto.

When the liquid sauces have the sugar content and/or viscosity in the range, or have a high viscosity and/or high sugar content, heat transfer may be difficult during the sterilization process, thereby making it difficult to control microorganisms. However, the instant food of the present application may exhibit a sufficient sterilization effect even while maintaining the sugar content and/or viscosity range of the liquid sauces. In addition, although the sterilization effect of viscous liquids is not large by a general liquid sterilization method, the instant food of the present application has an advantage of exhibiting a sufficient sterilization effect of the viscous sauces as described above.

The liquid sauces may have the number of microorganisms of $10^2$ cfu/ml to $10^8$ cfu/ml before liquid-sterilization, and for example, the number of microorganisms may be in the range of $10^3$ cfu/ml to $10^7$ cfu/ml, 1,500 cfu/ml to 5,000,000 cfu/ml or 1,800 cfu/ml to 4,500,000 cfu/ml. Unlike the solid raw ingredients, the liquid sauces are easier for microorganisms to grow due to a liquid, and the liquid sauces are characterized to be more susceptible to microbial contamination by containing raw ingredients other than water that may be used by microorganisms as nutrients. Accordingly, the instant food that is safer from microbial contamination may be prepared by sterilizing the liquid sauces through a separate liquid-sterilization step without performing the sterilization of the solid raw ingredients together. When performing the liquid-sterilization step according to the method for the preparation of the instant food of the present application, the steam is sprayed directly into and contacted the sauce, so that the microorganisms in the liquid sauces are sufficiently sterilized to have an effect that the quality of the sauces does not deteriorate by performing the sterilization under conditions within the range even while exhibiting a microbial level below a threshold value.

The method for the preparation of the instant food of present application includes sterilizing the solid raw ingredients and liquid-sterilizing the liquid sauces, and adding the sterilized sauces to the sterilized raw ingredients, and the steps of sterilizing the solid raw ingredients and liquid-sterilizing the liquid sauces are not limited to the order and may be changed for the purpose of sterilizing the solid raw ingredients and liquid-sterilizing the liquid sauces simultaneously or sequentially.

The method for the preparation of the instant food of the present application further includes adding the liquid sauces sterilized through the liquid-sterilization step to the solid raw ingredients sterilized through the step of sterilizing the solid raw ingredients. At this time, sterilized water may be further added along with the liquid sauces, and the amounts of liquid sauces and water to be added may be controlled considering the taste and quality to be implemented in the final instant food product. That is, considering the amount of moisture that allows the solid raw ingredients to produce the desired texture and taste in the final instant food product, and the concentration of the liquid sauces, the ratios and the amounts of the liquid sauces and the water may be appropriately controlled and added. For example, after the liquid sauces and the water are added, the liquid sauces and the water may be added so that the amount of water in the container becomes 30 parts by weight to 120 parts by weight based on 100 parts by weight of the solid raw ingredients, specifically 30 parts by weight to 110 parts by weight, 40 parts by weight to 105 parts by weight, 50 parts by weight to 100 parts by weight, 60 parts by weight to 95 parts by weight, or 70 parts by weight to 90 parts by weight. Considering the amount of water contained in the container as a result of immersing the raw ingredients in water and then removing the water, the amounts of liquid sauces and water may be appropriately controlled and added so that the amount of moisture within the range may be ultimately contained in the container.

The types of liquid sauces may vary depending on types or characteristics of the instant food to be prepared, and for example, the liquid sauces may include soy sauce, garlic, green onions, sugar, salt, sesame oil, honey, or combinations thereof. In a specific embodiment of the present application, the liquid sauces may be sauces for preparing flavored glutinous rice, and in this case, the liquid sauces may include honey.

The method for the preparation of instant food or instant rice of the present application may not include a cooking step. Specifically, the method may not include a cooking step in the steps before the sealing step after the sterilizing step. The cooking step generally refers to a process of heating the raw ingredients of Bap in the process of preparing rice, and for example, may be a step of heating to 90° C. to 120° C. Since the method for preparing the instant food or instant rice of the present application does not include a cooking step, there is an effect capable of reducing the number of times of heating the raw ingredients and preventing the quality of the instant food or instant rice from being deteriorated by heating. In addition, since microorganisms may be introduced into the container before sealing the container, sterile conditions need to be observed to prevent microbial contamination, but when the cooking step is not included before the sealing step, there is an advantage that a process that requires compliance with sterile conditions may be shortened or the time to be maintained in sterile conditions may be reduced. Accordingly, there is an effect capable of reducing the cost of creating sterile conditions and lowering the possibility of microbial contamination.

The method for the preparation of instant food of the present application may not apply heat of 90° C. or higher before the sealing step after the sterilization step. Specifically, the heat of 90° C. or higher, 96° C. or higher, 97° C. or higher, 98° C. or higher, 99° C. or higher, 100° C. or higher, 102° C. or higher, 105° C. or higher, 110° C. or higher, 120° C. or higher, 90° C. to 120° C., 97° C. to 117° C., 99° C. to 120° C., 100° C. to 117° C., 105° C. to 115° C., or 115° C. to 120° C. is not applied, but it is not limited thereto. Since the method for the preparation of instant food of the present application does not include the step of heating in the temperature range before the sealing step, there is an effect capable of reducing the number of times of heating the raw ingredients and preventing the quality of the instant food from being deteriorated by heating. In addition, since microorganisms may be introduced into the container before sealing the container, sterile conditions need to be observed to prevent microbial contamination, but when the step of heating in the temperature range is not included before the sealing step, there is an advantage that the time to be maintained in sterile conditions may be reduced. Accordingly, there is an effect capable of reducing the cost of creating sterile conditions and lowering the possibility of microbial contamination.

The meaning of "not applying heat" is a concept of including not only not applying heat in the above temperature range at all, but also temporarily applying heat in the temperature range for a short period of time ultimately to the same level as not applying heat according to common sense in the art. For example, even if the temporary heating is performed, it is included in the scope of the present application so long as no significant sterilization effect occurs or no change in Bap quality occurs. For example, the not applying heat may include applying heat in the above temperature range within 1 second, 2 seconds, 3 seconds, 5 seconds, 10 seconds, or 20 seconds, and may also include applying heat in the above temperature range two times or more for a short period of time.

In the method, a temperature of 89° C. or lower may be maintained before the sealing step after the sterilizing step. Specifically, the temperature may be maintained at 89° C. or lower, 88° C. or lower, 87° C. or lower, 85° C. or lower, 80° C. or lower, 75° C. or lower, 70° C. or lower, 10° C. to 89° C., 15° C. to 88° C., 20° C. to 85° C., 25° C. to 80° C., 20° C. to 70° C., 20° C. to 60° C. or 20° C. to 50° C., but is not limited thereto. In the method for preparing the instant food of the present application, as the temperature in the above range is maintained before the sealing step, there is an effect capable of reducing the number of times of heating the raw ingredients and preventing the quality of the instant food from being deteriorated by heating. In addition, since microorganisms may be introduced into the container before sealing the container, sterile conditions need to be observed to prevent microbial contamination, but when the temperature in the range is maintained before the sealing step, there is an advantage that the time required to maintain sterile conditions may be reduced. Accordingly, there is an effect capable of reducing the cost of creating sterile conditions and lowering the possibility of microbial contamination.

The meaning of "maintaining the temperature" is a concept including not only the case where the temperature in the above range is continuously maintained without interruption in time, but also the case where a temperature condition higher than the above temperature range is temporarily given for a short period of time, that is, the concept including the cases where the above temperatures are continuously maintained, and are ultimately the same under the technical common sense in the art. For example, even if the temperature condition higher than the above temperature range is temporarily given, it is included in the scope of the present application so long as no significant sterilization effect occurs or no change in the quality of instant food or Bap occurs. For example, the temperature condition higher than the above temperature range may be given for the time within 1 second, within 2 seconds, within 3 seconds, within 5 seconds, within 10 seconds, or within 20 seconds, and the temperature condition higher than the above temperature range may be given two times or more for a short period of time.

In the method for the preparation of instant food of the present application, the steps from the sterilizing step to the sealing step of the solid raw ingredients may be performed while maintaining sterile conditions. Since the container filled with sterilized solid raw ingredients, liquid sauces, and the like may be contaminated from external biological particles such as microorganisms and other non-living particles before sealing, there is a need to perform each process under controlled conditions of the contaminant particles floating in the air. The method of maintaining the sterile conditions may be applied without limitation as long as it is a method and condition commonly applied to the production of foods in the art, and specifically, the sterile conditions commonly applied to the preparation of processed foods, instant foods, retort foods, etc. may be applied. The sterile conditions may be maintained by performing each step in a clean room or clean booth, and for example, the process from the completion of the sterilization step to the start of the sealing step may be performed in a tunnel-shaped booth. In this case, the inflow of microorganisms may be prevented through clean air generated from a clean air generator (for example, a HEPA filter) installed in the booth, and the inside of the booth may be maintained at positive pressure.

The sealing step may include attaching a sterilized lid material, for example, a UV sterilized lid material, to the container, and may further include injecting inert gas into the container before sealing. The attaching of the container may be performed by the method of using heat, an adhesive, or pressure, but is not limited thereto. After the sealing step, external foreign substances or microorganisms may not be introduced into the container by a natural method, so that microbial contamination may be controlled, and sterile conditions may not be necessarily maintained in the subsequent steps. The container and the lid materials used in the method for the preparation of instant food of the present application may be used without limitation in shape, material, size, etc., as long as the container and the lid material may be commonly used in the preparation of instant food, and may be a container and a lid material that are not deformed or damaged even by heating to be subsequently performed. For example, the lid material may be a lead film, but is not limited thereto.

The method for the preparation of instant food of the present application includes heating the sealed container to a temperature of 90° C. to 125° C. for 10 minutes to 25 minutes. Specifically, the heating temperature may be a temperature in the range consisting of a lower limit selected from 90° C., 91° C., 92° C., 93° C., 94° C., 95° C., 96° C., 97° C., 98° C., 99° C., 100° C., 105° C., 107° C., 110° C., 112° C. and 115° C. and/or an upper limit selected from 125° C., 124° C., 123° C., 122° C., 121° C., 120° C., 119° C., 118° C., 117° C., 116° C. and 115° C. For example, the heating may be performed at a temperature of 90° C. to 125° C., 91° C. to 125° C., 92° C. to 124° C., 93° C. to 124° C., 94° C. to 123° C., 95° C. to 123° C., 95° C. to 122° C., 95° C. to 121° C., 96° C. to 121° C., 97° C. to 121° C., 100° C. to 120° C., 105° C. to 119° C., 107° C. to 118° C., 110° C. to 115° C., 110° C. to 118° C., 110° C. to 116° C., or 112° C. to 116° C., but is not limited thereto. The sterilization time may be a time in the range consisting of a lower limit selected from 10 minutes, 11 minutes, 12 minutes, 13 minutes, 14 minutes, 15 minutes, 16 minutes, 17 minutes, 18 minutes, 19 minutes and 20 minutes, and/or an upper limit selected from 25 minutes, 24 minutes, 23 minutes, 22 minutes, 21 minutes, and 20 minutes. For example, the heating may be performed for 10 minutes to 25 minutes, 11 minutes to 24 minutes, 12 minutes to 23 minutes, 15 minutes to 22 minutes, 17 minutes to 21 minutes, 19 minutes to 20 minutes, 20 minutes to 21 minutes, 12 minutes to 17 minutes, 13 minutes to 16 minutes, 18 minutes to 23 minutes, 19 minutes to 22 minutes, or 19 minutes to 21 minutes, but is not limited thereto. The temperature range and the time range may vary depending on the types of solid raw ingredients.

When the heating is performed according to the temperature range and the time, there is an advantage of enabling more complete microbial control by exhibiting additional sterilization effects. In addition, through the heating process under the conditions, the instant food or instant rice of the present application reaches a level similar to that of food or Bap prepared through the preparing process of conventional instant food or Bap to have the quality of food or rice suitable for eating, and prevent the deterioration of the quality of food or Bap due to an excessive heating condition, thereby preparing instant food or instant rice with excellent quality.

In other words, instant rice prepared by the method for the preparation of instant food of the present application may be easy to cook and store as an instant food, and also may have a texture and taste quality similar to Bap prepared through a general rice recipe at home or in a restaurant. In addition, even if solid raw ingredients and liquid sauces that are susceptible to microbial contamination or not easy to sterilize are used, it is possible to prepare instant rice in which the number of microorganisms may be controlled through sufficient sterilization and the quality of Bap does not deteriorate due to sterilization. The instant rice prepared by the method for the preparation of the present application may exhibit desirable taste and texture because the viscosity and sugar content of the liquid sauces are not reduced even after going through the sterilization process.

The temperature conditions of the heating step may be lower than the heating temperature for conventional retort sterilization, and specifically, may be lower than a retort sterilization heating temperature commonly used in preparing conventional instant foods. In addition, the temperature conditions of the heating step may be higher than the heating temperature during 'steaming', which is performed to transfer heat to the inside of the food in the general cooking process of Bap.

The heating step may be performed in a general retort apparatus by setting the temperature and time conditions to the above range, but is not limited thereto.

The method for the preparation of the instant rice of the present application may further include a step of cooling and drying after the heating step, and further include inspecting the appearance and condition of the prepared instant food and/or packaging one or more instant foods. The cooling step may be cooling by natural wind, but is not limited thereto, and the inspecting step may be visual inspection or sampling inspection, but is not limited thereto.

2. Instant Food (Instant Rice)

The instant food of the present application or the instant food prepared by the method for the preparation of the instant food of the present application may be instant rice, and specifically, honey glutinous rice may be prepared in the form of instant food.

The honey glutinous rice is instant rice including a sealed container: and honey glutinous rice made from at least one raw ingredient selected from the group consisting of jujubes, nuts and raisins, rice and sauce contained in the container, wherein the raw ingredients other than rice in the honey glutinous rice are contained in an amount of 5 parts by weight to 20 parts by weight based on 100 parts by weight of the contents contained in the container, the nuts are contained in an amount of 7 parts by weight to 18 parts by weight based on 100 parts by weight of the contents contained in the container, and the number of microorganisms in the instant rice may be negative within a shelf life.

The rice may include at least one selected from the group consisting of white rice, black rice, brown rice, non-glutinous rice, and glutinous rice.

The nuts may be at least one selected from the group consisting of chestnuts, pine nuts, pumpkin seeds, and peanuts.

The raw ingredients other than rice in the honey glutinous rice may be contained in an amount of 5 parts by weight to 20 parts by weight based on 100 parts by weight of the contents filled in the container.

The nuts may be contained in an amount of 7 parts by weight to 18 parts by weight based on 100 parts by weight of the contents contained in the container.

The non-glutinous rice may be added in a content of 10 parts by weight to 20 parts by weight based on 100 parts by weight of the contents when preparing the instant rice of the present application. In addition, the glutinous rice may be added in a content of 55 parts by weight to 65 parts by weight based on 100 parts by weight of the contents when preparing the instant rice of the present application.

The chestnuts may be added in a content of 8 parts by weight to 18 parts by weight based on 100 parts by weight of the contents when preparing the instant rice of the present application. In addition, the pumpkin seeds may be added in a content of 0.5 parts by weight to 3.5 parts by weight based on 100 parts by weight of the contents when preparing the instant rice of the present application. In addition, the raisins may be added in a content of 1.5 parts by weight to 4.5 parts by weight based on 100 parts by weight of the contents when preparing the instant rice of the present application. In addition, the pine nuts may be added in a content of 0.5 parts by weight to 1.5 parts by weight based on 100 parts by weight of the contents when preparing the instant rice of the present application.

The honey glutinous rice may further include a liquid sauce, and the sauce may include honey.

The chromaticity of the rice in the honey glutinous rice may be L value of 33.5 to 36, a value of 5.5 to 6.5, and b value of 13.5 to 14.5. The chromaticity of the raw ingredients in the honey glutinous rice measured after heating the honey glutinous rice in a 700 W microwave for 1 minute to 3 minutes, 1 minute 30 seconds to 2 minutes 30 seconds, or 2 minutes may have L value of 27 to 29, a value of 6.5 to 7, and b value of 10 to 11.

The honey glutinous rice may have one or more of the following physical properties obtained by measuring the Bap in the honey glutinous rice included in the container using a physical property analyzer, after heating the honey glutinous rice in a 700 W microwave for 1 minute to 3 minutes and 1 minute 30 seconds to 2 minutes 30 seconds, more specifically for 2 minutes: (i) hardness of 15 to 35; (ii) elasticity of 40 to 60; (iii) adhesiveness of 25 to 40; and (iv) stickiness of 65 to 105.

Advantageous Effects

According to a method for the preparation of an instant rice according to the present application, even if the instant food is prepared using the liquid sauces that are susceptible to microbial contamination and difficult to sterilize, the quality (e.g. viscosity, sugar content, etc.) of liquid sauces may not be damaged by sterilization while the number of microorganisms in liquid sauces is lowered to a threshold value or less and the problem of reduced quality caused due to strict sterilization does not occur, and thus the method for the preparation of instant food has an effect of preparing instant food having excellent quality with taste, nutritional value, texture, etc.

In addition, the method for preparation of instant food according to the present application, compared to a general method for the preparation of instant food, has advantages in terms of cost and microbial safety by using a new preparing principle to minimize changes in quality by reducing the number of heating times, and to simplify the time or steps to be performed by maintaining sterile conditions.

However, the effects of the present application are not limited to the above-mentioned effects, and other effects not mentioned will be clearly understood by those skilled in the art from the following description.

BEST MODE

Hereinafter, the present application will be described in detail by Examples. However, the following Examples specifically illustrate the present application in detail, and the contents of the present application are not limited by the following Examples.

EXAMPLES AND COMPARATIVE EXAMPLES

Example 1: Honey Glutinous Rice

Honey glutinous rice of Example 1 was prepared using liquid sauces such as honey, soy sauce and syrup, and various raw ingredients according to the method for the preparation of instant food of the present application. Specifically, non-glutinous rice, glutinous rice, sugared chestnuts, pumpkin seeds, raisins, pine nuts and sesame oil were used as the raw ingredients, and corn oil was added to the raw ingredients washed with water to be filled into the container. The mixing ratio of each ingredient was listed in Table 1 below. The filled container was moved to an RIC device (manufactured by Hisaka Seisakusho Co., Ltd.), and a steam pressure sterilization was performed at a temperature of 130° C. for 5 minute and 30 seconds in a vacuum state. The sterilization conditions corresponded to a sterilization condition in which an F0 value is 4 or more.

TABLE 1

| Raw ingredients | Mixing ratio (%) |
| --- | --- |
| Non-glutinous rice | 15.5 |
| Glutinous rice | 62.0 |
| Sugared chestnuts | 13.8 |
| Pumpkin seeds | 1.9 |
| Raisins | 2.9 |
| Pine nuts | 1.0 |
| Sesame oil | 1.0 |
| Corn oil | 1.9 |
| Total | 100.00 |

After sterilization of the raw ingredients was completed, a liquid sauce with a salt content of 0.9% and a sugar content of 28 brix was prepared by mixing cinnamon concentrate, dark soy sauce, honey, simple syrup, brown sugar, oligo-saccharide HF and refined salt, which was sterilized to be added to the container. The liquid sauce was sterilized by directly injecting steam at a temperature of 130° C. into the sauce using a direct steam injection heater (DSI) to raise the sauce temperature to 130° C. and maintain the state for 6 minutes. After adding the liquid sauce, the container was sealed with a lid material to prevent external microorganisms substances from being introduced into the container. The sealed container was moved to a retort sterilization device and heated by setting conditions of a temperature of 115° C. for 20 minutes to prepare the instant rice of Example 4. The temperature and time conditions of the device correspond to a relatively less strict condition compared to conventional retort sterilization conditions.

Comparative Examples 1 and 2: Honey Glutinous Rice

Honey glutinous rice of Comparative Examples 4-1 and 4-2 was prepared using raw ingredients mixed in the mixing ratio according to Table 1 above and a liquid sauce. An instant rice was prepared in the same manner as the method for preparing the honey glutinous rice in Example 1, except that some conditions were varied.

In Comparative Example 1, after performing the same method as in Example 1 until the container sealing step, a liquid sauce was sterilized and added through a general liquid sterilization method by heating at 100° C. for 10 minutes or more. In addition, an instant rice was prepared under the conventional retort heat sterilization conditions by heating the sealed container in a retort sterilization device at a temperature of 123° C. for 18 minutes, instead of the heating step in Example 1.

In Comparative Example 2, a liquid sauce was sterilized using a direct steam injection heater (DSI) under the same conditions as in Example 1 above, but the raw ingredients were sterilized by heating at 98° C. for 20 minutes and then sterilized under the condition where F0 was less than 4. After adding the liquid sauce and then sealing the container, an instant rice was prepared under the conventional retort heat sterilization condition heating the sealed container in a retort sterilization device at a temperature of 123° C. for 18 minutes, instead of the heating step in Example 1.

Experimental Example 1

[1-1] Comparison of Chromaticity of Honey Glutinous Rice

The lid material of the instant rice (honey glutinous rice) of Example 1 and Comparative Examples 1 and 2 prepared by adding the liquid sauces such as honey and soy sauce was removed and the colors thereof were measured and compared. In addition, the instant rice of Examples 1 and Comparative Examples 1 and 2 was heated using a microwave (700 W) for 2 minutes, and then the lid material was removed, and the colors of the Bap parts were measured and compared. For the colors, L, a, and b values were measured using an instrument manufactured by Konica Minolta company, and each value was measured three times, and average values thereof were shown in Tables 2 and 3 below, respectively.

TABLE 2

| | Before heating | | |
| --- | --- | --- | --- |
| | L | a | b |
| Example 4 | 34.57 | 5.92 | 14.03 |
| Comparative Example 4-1 | 33.13 | 5.84 | 13.40 |
| Comparative Example 4-2 | 36.17 | 5.92 | 13.88 |

TABLE 3

| | After heating | | |
| --- | --- | --- | --- |
| | L | a | b |
| Example 4 | 27.91 | 6.67 | 10.45 |
| Comparative Example 4-1 | 26.51 | 6.47 | 10.08 |
| Comparative Example 4-2 | 28.16 | 6.83 | 11.02 |

As a result, as can be seen in Tables 16 and 17 above, in the case of the honey glutinous rice in Example 1 of the present application, L value was measured to be relatively low and b value was measured to be high. The honey glutinous rice of Example 1 prepared according to the preparation method of the present application may be distinguished from the honey glutinous rice of Comparative Examples 1 and 2 in terms of color.

[1-2] Analysis of Cooked Rice Taste of Honey Glutinous Rice

With respect to instant food (honey glutinous rice) of Example 1 and Comparative Examples 1 and 2 heated using a microwave, a cooked rice taste value of each instant rice was shown in Table 4 below by measuring the appearance, hardness, glutinousness, balance, and palatability of the Bap parts using a taste meter (Tensipresser My Boy 2 system, Taketomo Electric Co., Japan).

TABLE 4

| | Appearance | Hardness | Glutinousness | Balance | Palatability |
| --- | --- | --- | --- | --- | --- |
| Example 1 | 8.4 | 9.4 | 9.8 | 7.3 | 74 |
| Comparative Example 1 | 8.7 | 9.0 | 9.8 | 7.5 | 78 |
| Comparative Example 2 | 8.7 | 8.9 | 9.8 | 7.4 | 77 |

As a result, in the instant rice of Example 1 prepared according to the preparation method of the present application, the hardness and glutinousness values were measured to be the highest compared to the instant food of the Comparative Example prepared through other methods.

[1-3] Analysis of Physical Properties of Honey Glutinous Rice

With respect to the instant food (honey glutinous rice) of Example 1 and Comparative Examples 1 and 2 heated using a microwave, the hardness, elasticity, adhesiveness, and glutinousness of the Bap parts were measured using a physical property analyzer (Tensipresser Analyzer, MyBoy, TAKETOMO Electric Incorporated) in the same method as Experimental Example 1-3 and shown in Table 5 below.

TABLE 5

| | | Hardness | Elasticity | Adhesiveness | Glutinousness |
| --- | --- | --- | --- | --- | --- |
| Example 1 | 1 | 32.04 | 57.30 | 30.99 | 92.82 |
| | 2 | 27.42 | 54.17 | 33.92 | 70.89 |
| | 3 | 18.67 | 44.36 | 38.15 | 103.64 |
| | 4 | 26.64 | 54.59 | 29.63 | 96.46 |
| | 5 | 20.53 | 49.50 | 30.84 | 69.27 |
| | Average | 25.06 | 51.98 | 32.71 | 86.62 |
| | Deviation | 5.43 | 5.10 | 3.43 | 15.60 |
| Comparative Example 1 | 1 | 35.74 | 64.95 | 35.03 | 153.97 |
| | 2 | 31.98 | 60.28 | 29.18 | 69.40 |
| | 3 | 24.23 | 50.00 | 37.32 | 92.12 |
| | 4 | 94.55 | 99.83 | 23.37 | 113.30 |
| | 5 | 36.48 | 58.04 | 27.33 | 66.25 |

TABLE 5-continued

| | | Hardness | Elasticity | Adhesiveness | Glutinousness |
| --- | --- | --- | --- | --- | --- |
| | Average | 44.60 | 66.62 | 30.45 | 99.01 |
| | Deviation | 28.34 | 19.34 | 5.69 | 36.13 |
| Comparative Example 2 | 1 | 28.87 | 59.41 | 37.55 | 106.77 |
| | 2 | 20.45 | 48.85 | 36.58 | 112.24 |
| | 3 | 33.98 | 66.04 | 34.97 | 75.73 |
| | 4 | 57.00 | 105.50 | 21.57 | 75.08 |
| | 5 | 37.37 | 57.92 | 28.52 | 80.35 |
| | Average | 35.53 | 67.54 | 31.84 | 90.03 |
| | Deviation | 13.59 | 22.09 | 6.73 | 17.99 |

As a result, it was confirmed that in the case of the honey glutinous rice of Example 1 prepared according to the preparation method of the present application, the measured result values of 1 to 5 samples were relatively uniform and a deviation therebetween was not large, but in the case of the honey glutinous rice of Comparative Examples 1 and 2, a deviation in the measured values of physical properties for each sample was very large. In particular, the hardness and elasticity measured values of the honey glutinous rice in Comparative Examples 1 and 2 showed very large deviations, but the reason why the deviation between physical property values of the honey glutinous rice of Comparative Examples 1 and 2 was shown so large is expected to be due to the deviation in texture that occurs due to strong retort heat sterilization treatment. This property is shown prominently in the honey glutinous rice of Comparative Examples 1 and 2 having a high content of glutinous rice ingredients, and since the honey glutinous rice according to Example 1 does not have a relatively large deviation in physical properties, it was confirmed that when the preparation method of the present application is used, an instant rice having consistent texture and quality can be prepared.

[1-4] Sensory Evaluation of Honey Glutinous Rice

The instant rice (honey glutinous rice) of Example 1 and Comparative Examples 1 to 2 was heated using a microwave, and then various kinds of sensory qualities were evaluated by trained professional panels. The sensory quality was evaluated by color preference, taste/flavor strength, overall taste preference, texture preference, and glutinousness preference of instant rice, and the result is shown in Table 6 below.

[Evaluation Criteria]

Color preference: Provided that 1 point is a minimum value and 5 points are a maximum value, the higher the color preference, the higher the score.

Taste/flavor strength: Provided that 1 point is a minimum value and 5 points are a maximum value, it means that the higher the taste/flavor strength, the higher the score.

Overall taste preference: As it is an item to evaluate the overall taste, provided that 1 point is a minimum value and 5 points are a maximum value, it means that the better the overall taste preference, the higher the score.

Texture preference: Provided that 1 point is a minimum value and 5 points are a maximum value, it means that the higher the texture preference, the higher the score.

Glutinousness preference: Provided that 1 point is a minimum value and 5 points are a maximum value, it means that the higher the glutinousness preference, the higher the score.

TABLE 6

| | Color preference | Taste/flavor strength | Overall taste preference | Texture preference | Gluti-nousness preference |
|---|---|---|---|---|---|
| Example 1 | 4.0 | 1.3 | 4.0 | 4.0 | 4.0 |
| Comparative Example 1 | 3.5 | 1.3 | 3.7 | 3.1 | 3.8 |
| Comparative Example 2 | 3.6 | 1.3 | 3.0 | 2.8 | 3.4 |

As a result, when compared with the honey glutinous rice of the Comparative Examples, the honey glutinous rice of Example 1 was measured to have the highest level in all of color preference, overall taste preference, texture preference, and glutinousness preference, so that it was confirmed and the honey glutinous rice of Example 1 exhibited superior sensory quality as compared with Bap prepared through other methods.

Experimental Example 2

Confirmation of the Number of Microorganisms of Honey Glutinous Rice

In order to confirm whether complete sterilization was performed in the honey glutinous rice product of the present application, the number of microorganisms contained in the raw ingredients or product was measured at each step.

With respect to the honey glutinous rice according to Example 1, first, the number of general bacteria and the number of heat-resistant bacteria for each of the raw ingredients were measured. The number of each bacterium was measured in non-glutinous rice, glutinous rice, chestnuts, pumpkin seeds, raisins and pine nuts, and the number of microorganisms was measured in a mixed solid ingredient sample mixed with the raw ingredients.

As a result, it was measured that general bacteria were present above a certain level in the raw ingredients before the sterilization step, and at least 550,000 cfu/ml of general bacteria were present in the solid mixture of the raw ingredients for preparing the instant rice.

The raw ingredients were included in the container, and then a steam pressure sterilization was performed at a temperature of 130° C. for 5 minutes and 30 seconds in an RIC device during the process of preparing the honey glutinous rice according to Example 1, and then a sterilizing effect was confirmed through a microbiology challenge test (MCT). The MCT is a method of determining whether a product has process and distribution stability by artificially inoculating microorganisms and observing changes in order to check whether to control target bacteria during the actual process of the product. As general bacteria, an orange capsules (MesaLabs SASU-302) containing 106 CFU/ml of *Bacillus subtilis* (ATCC 5230), which died under a condition of F0 of about 4 or less, was used, and as heat-resistant bacteria, a purple capsule (MesaLabs SA-608) containing 106 CFU/ml of *Geobacillus stearothermophilus* (ATCC 7953), which died at an F0 of about 21 or less, was used. The raw ingredients sterilized with the RIC device using the capsules were cultured for up to 48 hours at a temperature of 35° C. for the orange capsule and 55 to 60° C. for the purple capsule, respectively, and then color changes were confirmed. If there was no color change, it was determined to be negative, and if the color changed to yellow, it was determined to be positive (Table 7).

As a result, it was confirmed that as a result of steam pressure sterilization using the RIC device, all microorganisms that had been present in the raw ingredients before sterilization were killed to exhibit a sufficient sterilization effect.

TABLE 7

| Measuring sample | Sample name | MCT |
|---|---|---|
| RIC sterilized sample 1 | 4-carriage 1-stage 35° C. | Negative |
| RIC sterilized sample 2 | 4-carriage 1-stage 55° C. | Negative |
| RIC sterilized sample 3 | 4-carriage 7-stage 35° C. | Negative |
| RIC sterilized sample 4 | 4-carriage 7-stage 55° C. | Negative |
| RIC sterilized sample 5 | 4-carriage 12-stage 35° C. | Negative |
| RIC sterilized sample 6 | 4-carriage 12-stage 55° C. | Negative |

Furthermore, after steam pressure sterilization, a finished instant rice product was prepared through w water addition, sealing, and additional heating processes, and bacterial growth experiments were conducted on the finished product. In the bacterial growth experiments, the instant rice product was stored at 35° C. for 10 days and then sampled to determine the growth of general bacteria and heat-resistant bacteria. According to a common measurement method in the art (based on the bacterial growth experiments according to a general test method of the Ministry of Food and Drug Safety), each finished product sample was preserved in an incubator at a temperature of 35 to 37° C. for at least 10 days, and then the sample obtained from the sample was homogenized with a diluent and cultured in a culture medium at 35 to 37° C. for 45 to 51 hours, and then bacterial growth was measured. As a result, as shown in Table 8 below, no bacterial growth was observed in all 12 instant rice samples, which were shown as negative, but despite the presence of a large amount of microorganisms in the raw ingredients, it was confirmed that all microorganisms were killed in the instant rice prepared through the preparation method of the present application through sufficient sterilization.

TABLE 8

| Measuring sample | Sample name (carriage-stage-number) | Bacterial growth |
|---|---|---|
| Finished product sample 1 | 3-2-1 | Negative |
| Finished product sample 2 | 3-2-1 | Negative |
| Finished product sample 3 | 3-2-1 | Negative |
| Finished product sample 4 | 3-2-7 | Negative |
| Finished product sample 5 | 3-2-7 | Negative |
| Finished product sample 6 | 3-2-7 | Negative |
| Finished product sample 7 | 3-2-14 | Negative |
| Finished product sample 8 | 3-2-14 | Negative |
| Finished product sample 9 | 3-2-14 | Negative |
| Finished product sample 10 | 3-3-1 | Negative |
| Finished product sample 11 | 3-3-1 | Negative |
| Finished product sample 12 | 3-3-1 | Negative |

Hereinabove, representative Examples of the present application have been exemplarily described, but the scope of the present application is not limited to the specific Examples as described above, and can be changed appropriately by those skilled in the art within the scope described in the appended claims of the present application.

The invention claimed is:

1. A method for the preparation of microwaveable instant food, comprising:

filling solid raw ingredients into a container, wherein the solid raw ingredients comprise at least one selected from the group consisting of grains, beans, mushrooms, root and tuber crops, bulbs, seasoned vegetables, fruits, seeds, meats, fish, and eggs;

sterilizing the solid raw ingredients filled in the container by introducing pressurized steam into a sterilizer under a vacuum;

sterilizing liquid sauces by spraying steam directly on the liquid sauces, wherein the sterilizing the liquid sauces is performed for 6 to 8 minutes by directly spraying steam at 130° C. to 140° C. to the liquid sauces;

adding the sterilized liquid sauces to the sterilized solid ingredients;

sealing the container added with the sterilized liquid sauces; and heating the sealed container at a temperature of 90° C. to 125° C. for 10 to 25 minutes.

2. The method for the preparation of microwaveable instant food of claim 1, wherein the solid raw ingredients have the number of microorganisms of $10^2$ CFU/ml (Colony-Forming Units per milliliter) to $10^8$ CFU/ml in the raw ingredients before sterilization.

3. The method for the preparation of microwaveable instant food of claim 1, wherein the sterilizing of the solid raw ingredients is performed with steam at 120° C. to 140° C. for 1 minute to 10 minutes.

4. The method for the preparation of microwaveable instant food of claim 1, wherein the sterilizing of the solid raw ingredients is performed by repeatedly contacting the solid raw ingredients 5 to 10 times with steam at 140° C. to 155° C. for 3 seconds to 10 seconds.

5. The method for the preparation of microwaveable instant food of claim 1, further comprising immersing the solid raw ingredients in water, before filling the solid raw ingredients in the container.

6. The method for the preparation of microwaveable instant food of claim 1, wherein the sterilizing the liquid sauces is performed using a Direct-Steam Injection (DSI) sterilization device.

7. The method for the preparation of microwaveable instant food of claim 1, wherein the viscosity of the liquid sauces is 0 to 2,000 centipoise (cP).

8. The method for the preparation of microwaveable instant food of claim 1, wherein the sugar content of the liquid sauces is 0 to 60 brix.

9. The method for the preparation of microwaveable instant food of claim 1, wherein the liquid sauces have the number of microorganisms of $10^2$ CFU/ml to $10^8$ CFU/ml before sterilization.

10. The method for the preparation of microwaveable instant food of claim 1, wherein a cooking step is not included.

11. The method for the preparation of microwaveable instant food of claim 1, wherein the method does not comprise applying heat that raises the temperature of the sterilized solid ingredient to 105° C. or higher during the period after sterilizing the solid raw ingredients and before sealing the container.

12. The method for the preparation of microwaveable instant food of claim 1, wherein a temperature of the sterilized solid ingredient is maintained at 104° C. or lower by not applying heat during the period after sterilizing the solid raw ingredients and before sealing the container.

13. The method for the preparation of microwaveable instant food of claim 1, wherein the number of microorganisms in the solid raw ingredients measured after the heating step is 0 CFU/ml.

14. A microwaveable instant food prepared by the preparation method according to claim 1.

* * * * *